United States Patent
Lyon

(10) Patent No.: US 8,448,860 B2
(45) Date of Patent: May 28, 2013

(54) SYSTEM AND METHOD FOR DETERMINING ASSET LOCATION IN A RACK

(75) Inventor: Geoffrey M Lyon, Half Moon Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 500 days.

(21) Appl. No.: 12/714,513

(22) Filed: Feb. 28, 2010

(65) Prior Publication Data

US 2011/0210167 A1    Sep. 1, 2011

(51) Int. Cl.
*G06K 15/00* (2006.01)

(52) U.S. Cl.
USPC ..... 235/383; 340/5.9; 340/572.1; 340/539.22

(58) Field of Classification Search
USPC ............... 235/383; 340/5.9, 572.1, 539.22
See application file for complete search history.

(56) References Cited

U.S. PATENT DOCUMENTS

| | | | | |
|---|---|---|---|---|
| 6,552,663 | B2 * | 4/2003 | Swartzel et al. | 340/572.1 |
| 2007/0035380 | A1 * | 2/2007 | Overhultz et al. | 340/5.9 |
| 2008/0099557 | A1 * | 5/2008 | James | 235/385 |
| 2009/0146782 | A1 * | 6/2009 | Cordes | 340/10.1 |
| 2010/0039228 | A1 * | 2/2010 | Sadr et al. | 340/10.1 |

* cited by examiner

*Primary Examiner* — Allyson Trail

(57) ABSTRACT

The present invention describes a method of determining the location of an asset comprising the steps of: for each asset tag in the rack, exchanging identity information and location information with at least one tag of a neighboring asset, wherein at least the location information is exchanged along a substantially physically unobstructed path between the asset tag and it's at least one neighboring asset tag; for each asset tag, transmitting the identity information and location information exchanged to a collection unit; and responsive to the information transmitted to the collection unit determining the location of the asset relative to other assets.

17 Claims, 10 Drawing Sheets

SYSTEM AND METHOD FOR DETERMINING ASSET LOCATION IN A RACK

BACKGROUND

Data centers contain large number of servers and other assets. Current systems that attempt to autonomously or remotely determine asset location, often offer incomplete or unreliable data. As a result of this situation, inventory management and auditing of data center facilities (often sites that contain hundreds of racks and thousands of individual computing, communication and other miscellaneous assets) may need to be performed or verified manually. A further complication of inventory information is that it is often superseded by onsite alterations or undocumented changes. Hence it can be difficult for operations staff to quickly locate a particular asset, especially under fault conditions or if the asset has been moved during a prior rack or site reconfiguration.

Different systems offer different types of asset location information. For example, one system provides room level information regarding what room in the data center an asset is physically located in. In this system, the room is flooded with an IR signature that the tags can interpret and re-transmit over their RF channel to a reader located in the room. Hence, the reader can determine the coarse location (with respect to an IR transmitter placed at a known location). The coarse location information provided by this system, however, does not provide positioning and ordering information of the asset within the rack.

Indoor location techniques based on wireless signal characterization have been implemented in combination with active RFID (radio frequency identification) tags to form location aware asset tags. One approach relies on performing RF signal strength (RSSI) measurements that act as a proxy for propagation path distance. Although suitable for free-space (line of sight) deployments, their use within aggressive indoor environments such as the data center remains challenging (multiple RF pathways, sources of RF noise, metallic surfaces, conditions conductive to the formation of standing wave). Further these RF signal strength implementations typically do not provide sub-meter range accuracies for facilitating determination of asset location in a rack. Carrier-less or ultra-wide RF systems have also been demonstrated and offer improved (sub-meter) resolution accuracies but, as a general rule, these are also susceptible to the same environmental RF issues identified above.

Conventional RFID asset tracking systems attach RFID tags to assets within the rack. The RFID tags communicate with a reader or base station via short range RF signaling, as long as the tags are all within operating range of the reader. However, although the reader is made aware of the assets within the rack, the reader does not know the relative ordering or absolute position of the assets within the rack.

BRIEF DESCRIPTION OF THE DRAWINGS

The figures depict implementations/embodiments of the invention and not the invention itself. Some embodiments of the invention are described, by way of example, with respect to the following Figures.

DETAILED DESCRIPTION

For simplicity and illustrative purposes, the present invention is described by referring to a number of exemplary embodiments thereof. In the following descriptions, numerous specific details are set forth in order to provide a thorough understanding of the present invention. It will be apparent however to one of ordinary skill in the art, that the present invention may be practiced without limitation to these specific details. In other instances, well know methods and structures have not been disclosed in detail so as not to unnecessarily obscure the present invention.

In the case of rack mounted assets within a data center, we provide a means to autonomously determine the relative order and position of assets within each rack. This determination is performed using a method comprised of the steps of for each asset tag in the rack, exchanging identity information and location information with at least one tag of a neighboring asset, wherein at least the location information is exchanged along a substantially physically unobstructed path between the asset tag and it's at least one neighboring asset tag; for each asset tag, transmitting the identity information and location information exchanged to a collection unit; and based on the identity and location information transmitted to the collection unit, determining the location of the asset.

Figure 1:
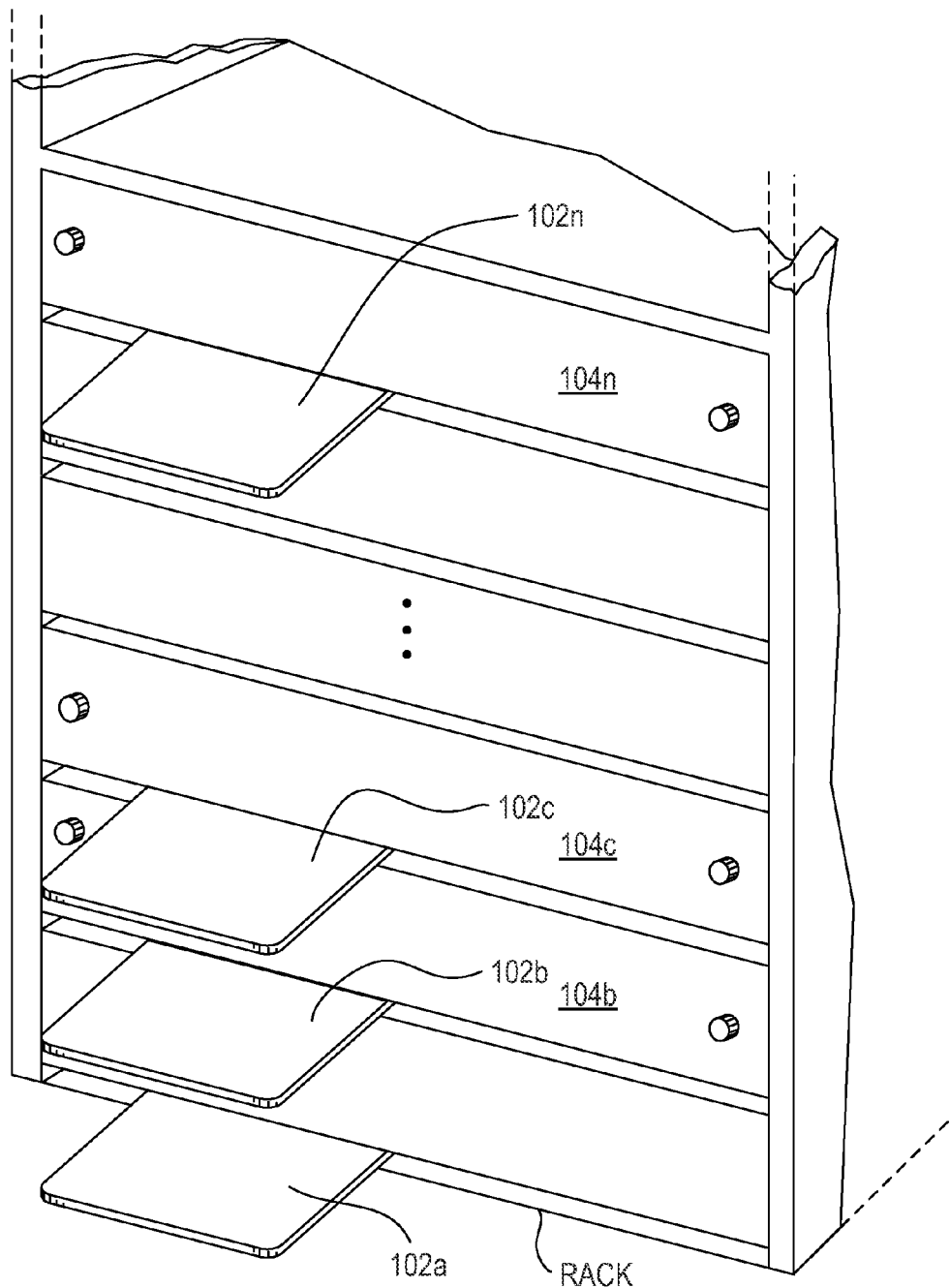
FIG. 1 shows a simplified front perspective view of an asset locating system for locating an asset within a data center rack according to one embodiment of the invention.

FIG. 1, shows a simplified perspective front view of an asset locating system for locating an asset within a data center rack according to one embodiment of the invention. The system 100 is illustrated as including a plurality of tags 102a-n, with each tag 102a-n associated with a corresponding different asset 104b-n within the rack. In the following description, the rack 104a itself is considered an asset and has a tag 102a is associated with it. Data transmitted from the asset tags is sent to a reader device or collection unit (not shown).

Referring to FIG. 1, the tags 102a-102n are shown as attached to the asset, however, the tags may be mounted to, printed on, integrated or encapsulated within each of the respective assets 104a-104n. For example, the tags 102a-102n may be attached to the respective assets 104a-104n by adhesive, by metal fasteners and the like. Those skilled in the art will recognize that many other methods of physically associating the tags with respective assets are possible and the present invention is not limited to the examples set forth herein. In other words, it is not necessary to mount the tags 102a-102n exactly as shown and it is contemplated that the tags 102a-102n may be located at any other reasonably suitable location with respect to the assets 104a-104n.

In the embodiment shown in FIG. 1, because front panel real estate is considered valuable, the tags 102a-n shown extend from the underside of the front asset. However, the tags 102a-102n could be positioned to extend from the topside of the asset. Alternatively, as long as reasonably suitable, the tags could be mounted on the front panel, on the back side of the asset, on the top side or bottom side of the asset. A reasonably suitable location for the tags should allow the tags 102a-102n to transmit information to the collection unit. Further a reasonably suitable location for the tags should allow the local proximity component of the tag 102a-n to exchange information with a neighboring asset along a substantially unobstructed path for information exchange between the asset and the neighboring asset.

Figure 2A:
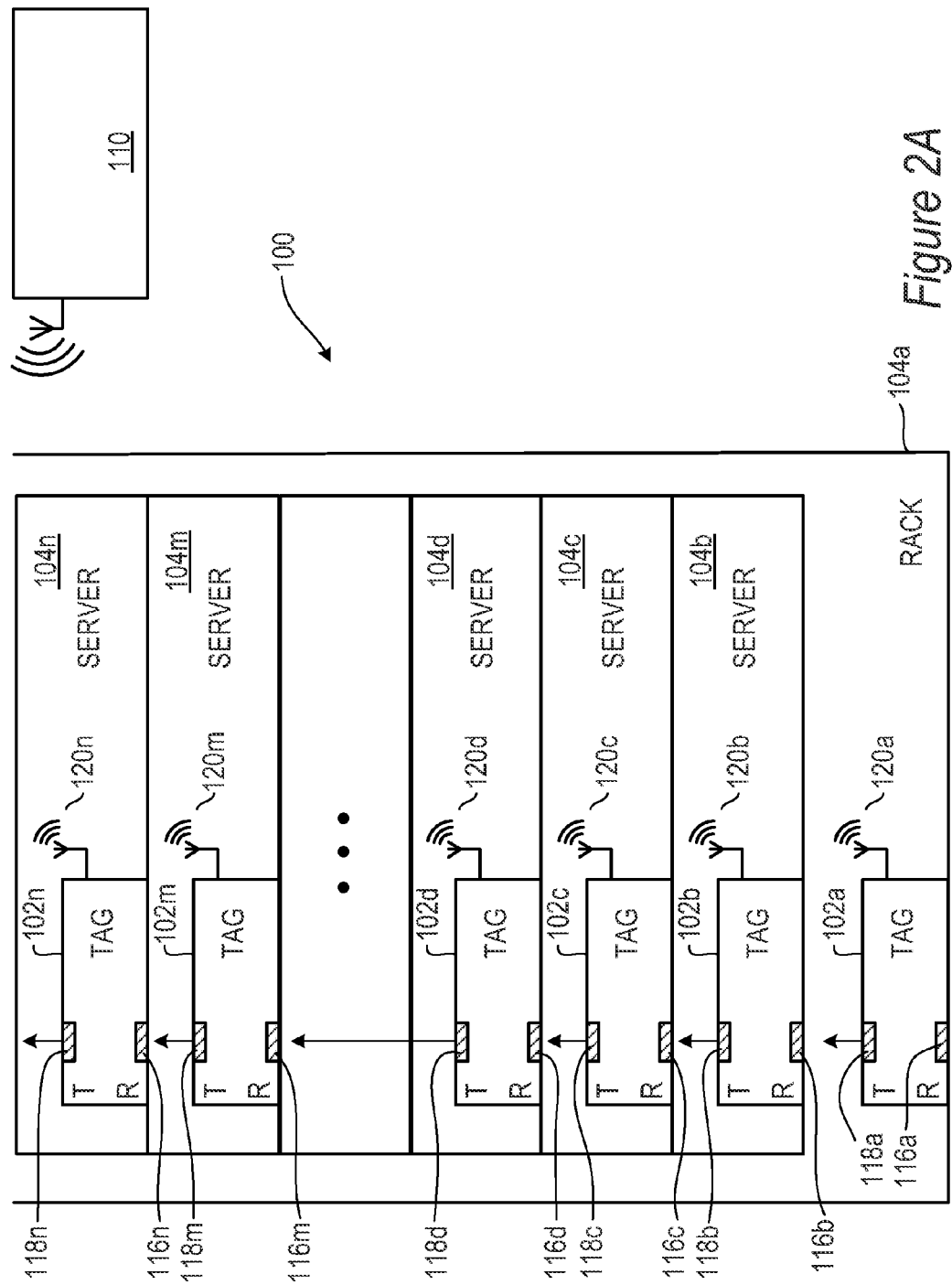
FIG. 2A shows a simplified front view of an asset locating system for locating an asset within a data center rack according to one embodiment of the invention.

FIG. 2A shows a simplified front perspective view of an asset locating system for locating an asset within a data center rack shown in FIG. 1. In addition to the data center rack, FIG. 2A also shows a reader device or collection unit 110. The reader is generally depicted as being positioned to locate and track assets in a rack 104a. The rack 104a may comprise an electronics cabinet and the assets 104a-104n may comprise, for instance, computer systems, servers, memories, hard drives, power supplies, etc. Although the system is shown as including particular features, it should be understood that the system may include additional components or assets and that some of the assets described may be removed and/or modified without departing from the scope of the system. Although the rack 104a has been illustrated as comprising a relatively small number of bays and assets, it should be understood that the rack 104a may include any suitable number of bays and assets without departing from a scope of the system 100. Also, it should be understood that the Figures may not be shown to scale. For example, the thickness of the tag shown may not be shown to scale with regards to the thickness of the asset shown.

Certain inferences regarding the positioning of the asset within the rack can be made based on the fact that the mechanical structure of the rack is dictated by industry standards. Industry standard server racks to house computing and communication assets (e.g. servers and switches) have slots for positioning assets within the rack in a vertically ordered manner. A typical data center rack is 2 meters tall and contains 42 "U" slots, each of which occupies a height of 1.75 inches. These slots may house a single (1 U) computing asset, whereas larger assets often span an integer number of adjacent slots.

As used herein, the terminology "tag" may be defined as hardware, information, signals and the like, that are not necessarily intrinsic to the circuitry or software associated with the assets 104a-104n to which the tags 108 are associated. In other words, the tags may be internally or externally attached to the respective assets 104a-104n and may be independent of the intrinsic workings of the respective assets 104a-104n.

Referring to FIG. 2A, the asset tags 102a-n include a component for providing local proximity sensing (IR components 116a-116n, 118a-n) and a component for intermediate range messaging (RFID component 120a-n). The local proximity component of the tag has a range that allows the exchange of information between neighboring assets. As used throughout the present specification, the term "neighbor" or "neighboring asset" means the asset in the rack that is physically adjacent to the asset of interest. Because all assets in a data center rack are vertically stacked as dictated by industry standard, neighboring asset here means the asset that is physically below or above the asset of interest. Say for example, we are interested in learning the relative position of asset 104d within rack 104a, then the asset of interest is asset 104d. The neighboring assets of the asset of interest 104d, are the two assets 104c (located below 104d) and 104e (located above 104d). For the special case of where there is only one asset in the rack, there is only one neighboring asset—the rack asset 104a.

Referring to FIG. 2A, the asset tag 102a-n has two communication channels available. One channel that is capable of communicating in an intermediate range with a collection unit some distance away from the rack and another capable of communicating with neighboring assets. Another channel is capable of communicating locally with neighboring asserts. IR is short range, but for the data center implementation, it has enough range to exchange information with a neighboring asset. This is why an intermediate range component is necessary for sharing data wirelessly amongst multiple racks within a data center. RF communication can provide a gross measure of location, typically to within a few meters in line of sight deployments. However, it is not well suited to finding asset location within the range of accuracy range needed for determining relative or absolute position within a data center rack. Although there may be some overlap in their ranges (IR ranges approximately between 0.2 meters and 1 meter effectively, while RF ranges approximately between 1 meter and 30 meters effectively), the present application attempts to use the communication channel and its most effective and reliable range to cover a wider range necessary for both finding an accurate placement within a rack and exchanging data within the data center.

In one embodiment, the local proximity sensing for communicating with neighboring assets is implemented using IR devices (IR transmitters 116a-n, IR receivers 118a-n), often using industry standard IrDA compliant components. Typically, the power of the IR device controls or is related to the distance range of the IR component. For example, low power IR devices typically have a distance range of approximately 20 cm, while higher power IR devices typically have a distance range of around 1 meter.

The asset tags 102a-102n are shown mounted to their respective assets 104a-n. The tags 102a-n may be encoded with an identification number. For example, the tags may comprise for instance, radio frequency (RF) tags programmed with substantially unique identification codes that identify the assets 104a-104n with which the tags are associated. Similarly, the IR component can be encoded with a unique identification number, for identifying the asset.

FIG. 2A shows the IR components 116a-116n, 118a-n of an asset tag according to one embodiment of the invention. In this case, the proximity link is provided by positioning an IR transmitter component 116a-n on the top-side of each tag 102. A corresponding IR receiver component 118a-n is positioned on the bottom side of each tag 102a-n. In the embodiment show, the tags are vertically aligned so that IR transmitter component 116a-n of the tag of the asset of interest is optically aligned with the IR receiver component 118a-n of its neighboring asset. This optical alignment allows each tag to transmit an identifying sequence (perhaps the same as it's unique or pre-programmed identification number) to its neighboring asset.

Referring to FIG. 2A, the IR component of the asset tag transmits or exchanges information only with its neighboring assets. In one embodiment, the neighboring assets transmit identification information and location information. Regarding the location information, the tag of interest may not know its absolute position within the rack, but it does know using IR communication who its neighboring assets are (through the unique serial identification) and the orientation (whether above or below) of its neighboring asset. The orientation of the asset provides location information that can be used to determine relative location in the rack compared to other assets.

Because the asset is in a vertically stacked rack, the IR signal from its neighboring asset will be transmitted either from below or above the asset. For example, if the asset of interest is asset 104c, then it would receive a signal at receiver 118c. Since the signal is received at receiver 118c, the asset tag knows that the signal is coming from an asset physically located below it. In one embodiment, each asset tag includes a processor and memory. Thus, in one embodiment data about itself (the asset of interest) and its neighboring asset is stored in the tag memory.

Figure 2B:
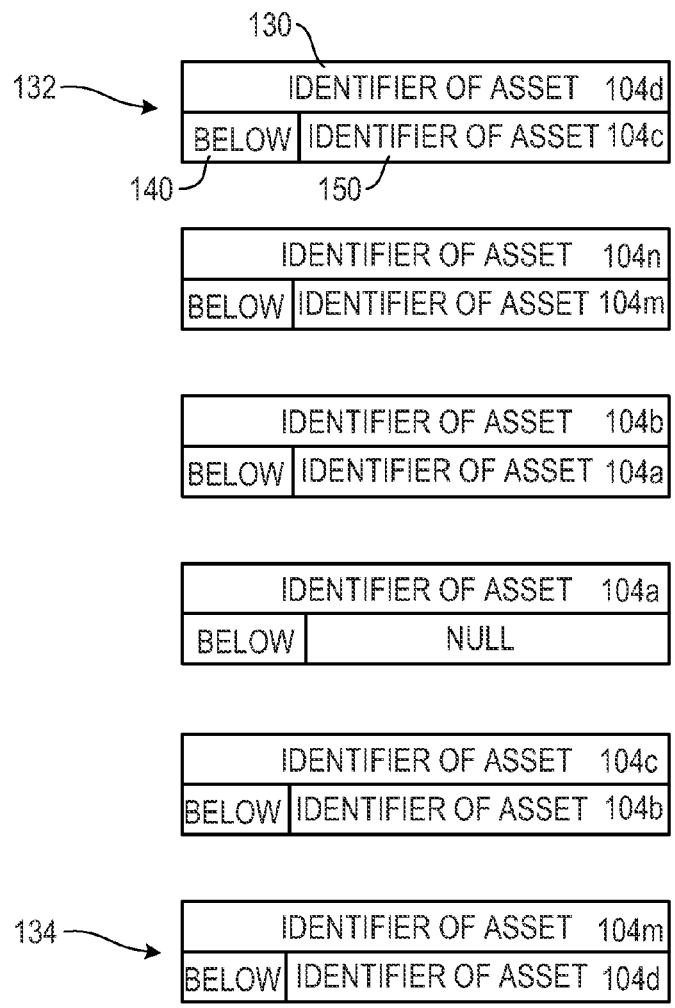
FIG. 2B shows an exemplary transmission stream to the data collection unit in the asset locating system according to the embodiment shown in FIG. 2A.

Referring to FIG. 2B shows a possible data format and listing of data transmitted to the data collection unit according to FIG. 2A. The order of the data and format can vary. In the embodiment shown in FIG. 2B, the format includes a first section 130 that includes the asset identification of the asset of interest. For the transmission labeled 132, the asset of interest is 104d. The format of the transmission then includes a location indicator section 140. In one embodiment, the data value entered into this section is zero if the neighboring asset is located above the asset of interest, and entered as a one if the neighboring asset is physically located below the asset of interest. A special code might also be entered into the location indication section 140, say for example a value of 10, for the rack asset. After the location indicator section 140 is the neighboring asset identification section 150. This section 150 stores the data value of the unique identifier associated with the neighboring asset.

Figure 2C:
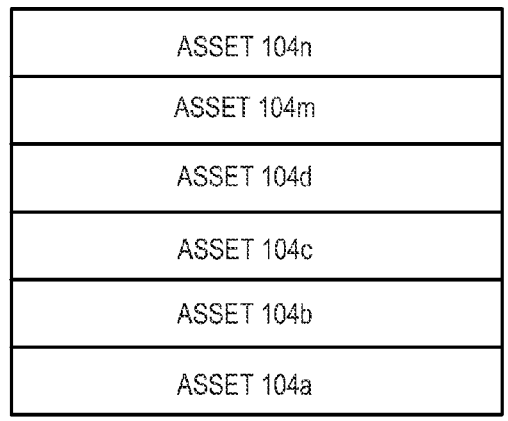
FIG. 2C shows the asset listing resulting from the transmission stream of FIG. 2B according to one embodiment of the invention.

Referring to FIG. 2B, the relative order of the assets within a rack may not be known by the data collection unit. This can be determined, typically using software stored on a processor in the data collection unit or software connected to the data collection unit. The software looks at the transmissions identification and location information and creates an order of all of the assets relative to each other. For example, we know from transmission 130 that asset 104d is above asset 104c. From transmission 134 we know that asset 104m is physically located next to and above asset 104d. After, analyzing all of the data transmissions for a particular rack, a data listing of all of the assets in the rack can be created and is shown in FIG. 2C.

Figure 3B:
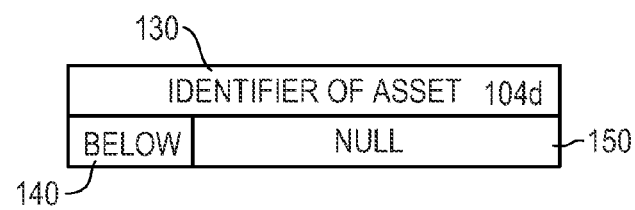
FIG. 3B shows an exemplary transmission stream to a neighbor asset in the asset locating system according to the embodiment shown in FIG. 3A.
Figure 3C:
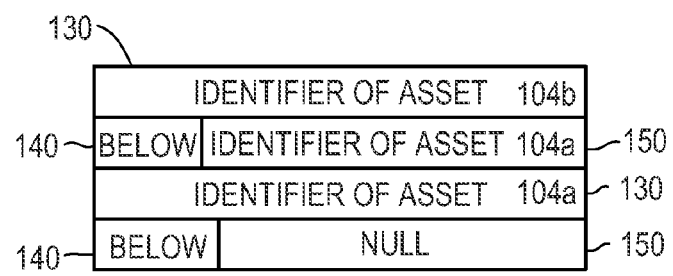
FIG. 3C shows an exemplary transmission stream to a neighbor asset in the asset locating system according to the embodiment shown in FIG. 3A
Figure 3A:
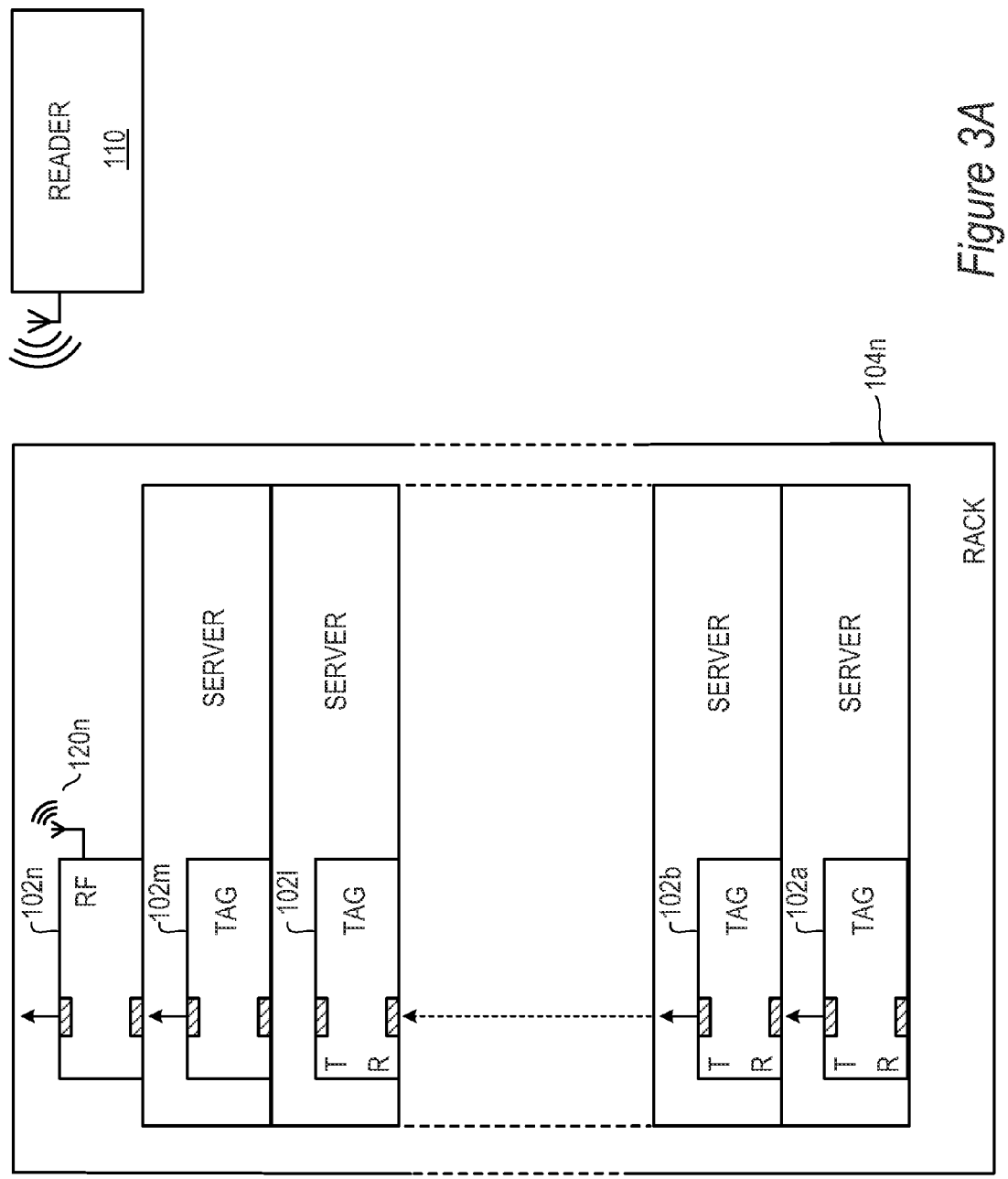
FIG. 3A shows a simplified front view of an asset locating system for locating an asset within a data center rack according to another embodiment of the invention.

Although the exchange of data in FIGS. 2A and 3A is shown cascading through the tag chain in an upward direction (from tag 102a-102n), this is merely for purposes of example. Data flow can also be downward or bidirectional. For example, in one embodiment, data is cascaded downward along the tag chain (from tag 102n-102a). In an alternative embodiment, data flow could also be bidirectional. However, for a bidirectional implementation, the implementation would change so that instead of each tag having a transmitter on only one side of the tag and a receiver on the other, each side of the tag would need to have a transceiver (a dual transmitter/receiver pair) on each side of the tag.

As shown in FIG. 2A, the lowest tag in the chain 102a is attached to the rack. This enables the tag chain (102a-102) to be identified with a particular rack enclosure. In one embodiment, the tag associated with each asset has a unique identifier. Thus, the rack has an identifier that allows the rack to be uniquely identified within the data center. Because the rack identification is shared with neighboring assets up the tag chain, the assets within the rack will know which rack within the data center they are associated with. Thus, having the rack have a tag associated with it provides an association between the assets within the rack and the rack itself.

Referring to FIG. 2A, each asset tag has an intermediate range transceiver 120a-120n for communication with a data collection unit 110. Each tag, when interrogated by the reader or at a pre-determined time interval transmits its own identity value to the remote reader, together with the identity (if known) of the neighbor asset below it. Hence, over time, the reader is able to build an ordered list of assets within the rack and determine the relative locations of the enclosed assets.

The goal of the proximity sensing component (116a-n, 118an-n) of the asset tag is to provide an exchange of data only with its neighboring assets. This can be controlled by restricting the distance range of the IR device. For example, in one embodiment range is limited by only using an IR component within a certain power range so that it only can exchange data with its neighbor. In an alternative embodiment, the field of view of the IR component is restricted. One method of restricting the field of view is by narrowing the optical sensor's (the transceiver's) field of view, so that it is restricted to communicating only with its neighboring asset.

Alternatively the exchange of data can be controlled by choosing the appropriate range or by allowing the IR beam to be stopped by the physical structure of the asset. For example, in one embodiment the IR transmitter component is placed in the center on the top of the server. In this embodiment, a corresponding receiver would be placed on the bottom side of the neighboring server in the center of the server asset, so that it is aligned with the IR transmitter. Placement of the tag on top of the asset surface, could be a valuable implementation where for example, the server has a door which makes having an IR component which extends from the underside of the server difficult since the right amount of clearance may not be available. In this embodiment, the IR component is limited to sensing only its neighboring asset—by the physical structure of the asset. In other words, since the IR signal can not transmit through the asset, it can only communicate with its neighboring IR component.

The tags 102a-n may comprise active devices, passive devices, or a combination of active and passive devices. In one embodiment, the asset tags incorporate sensors which report the environmental conditions that the rack assets are subject to. Active RFID tags are available that provide a mechanism to identify and sense the environmental conditions these assets are subject to. The ability to provide sensor data that corresponds to a particular asset in a rack could be used to affirm that an asset was maintained within certain operating ranges (maximum air temperature, humidity, etc.)

to fulfill warranty requirements. In an alternative embodiment, an active sensor tag could be tied to the inlets and/or outlets of an asset. Heating and cooling on a gross scale (entire data center room, a particular rack in a data center) often results in over provisioning, resulting in over cooled facilities and higher running costs. As energy efficiency becomes a more important metric for data center operations management, monitoring the individual environmental parameters at the asset level provides the sensing input to enable localized control of the cooling resource.

In an alternative embodiment, the assets 104a-104n may comprise goods (i.e., consumer goods) configured to be located and tracked. However, this case would be limited by the constraints similar to the data center case—goods would need to be stacked vertically. Further there would need to be a uniformity of the size and shape of the goods and the spacing of the goods in the rack holding the goods. Although the term rack is used, rack may be used to define any enclosure which requires vertically ordered stacking and requires stacking of assets at some regular spacing interval or some integer variable of the spacing interval.

FIG. 3A shows a simplified front view of an asset locating system for locating an asset within a data center rack according to another embodiment of the invention. Compared to the implementation shown in FIG. 2A, the embodiment shown in FIG. 3A does not include an RF transmitter 120a-n that is associated with each asset. Instead only a single RF transmitter is used. This has the advantage of minimizing the required RF circuitry, reducing the cost of the asset tags, but burdens each successive tag in the chain with a requirement to transmit an increasing amount of data to its neighboring asset as it cascades up the tag chain. Despite this data increase, localized short range IR transmissions should require less power than if each message exchange is sent by a local RF transmitter as in the prior case.

As previously stated, the embodiment shown in FIG. 3A uses a single RF transmitter to communicate with the data collection unit 110. In the implementation shown in FIG. 3A, the uppermost tag 102n includes both an IR component and an RF component. In one embodiment, the uppermost tag is attached to the rack to anchor or associate the asset chain to its rack enclosure. The asset tags physically located below the uppermost tag 102n contains only the IR transmit and receive components. This enables the IR components to cascade their identities and position information upward through the tag chain (102a-102n).

In the embodiment shown in FIG. 3A, each successive tag in the tag chain (102a-102n) could retain information regarding all those positioned below it. For example, if a data transmission format similar to that shown in FIG. 2B were used, then the first data exchange between assets 104a and 104b would be the transmission shown in FIG. 3B. Similarly, the transmission exchange between assets 104b and 104c would be the data exchange shown in FIG. 3C. As can be seen, the amount of data transferred in FIG. 3B is greater than the amount of data transferred in FIG. 3C. As the data exchange continues up the chain, the amount of data increases. The asset information would cascade upward through the tags in the rack, thus enabling the uppermost tag to transmit an information stream to the reader that contains the entire rack inventory and relative ordering of the enclosed assets.

In the embodiment shown in FIG. 3A, the asset tag at the end of the tag chain 102n has an RF transmitter to exchange data with the data collection unit 110. In an alternative embodiment, the data received by the end tag chain 102 could be hard wired, say into an Ethernet port, to the data collection unit 110. As with FIG. 2A, the direction of transmission could be reversed, so that the direction of data flow shown in FIG. 2 would be downward. In this implementation, the RF transmitter 120 would be physically located at the bottom of the asset tag chain.

Figure 4:
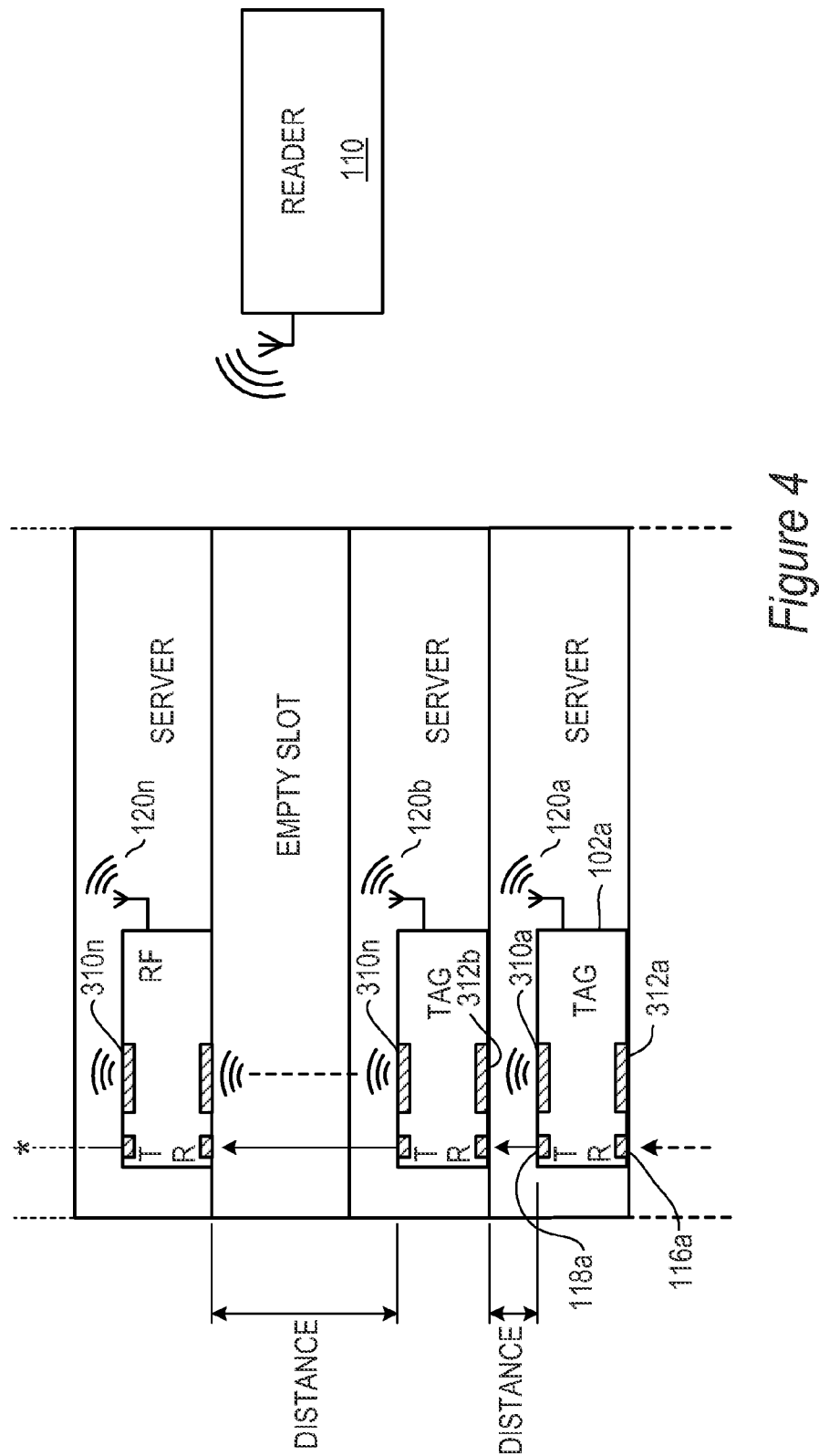
FIG. 4 shows a simplified front view of an asset locating system for locating an asset within a data center rack according to one embodiment of the invention.

Although the implementations shown in FIGS. 2A and 3A provide the information necessary to determine the relative position of assets, they do not typically provide sufficient information to determine the absolute position of the assets within the rack and the physical distances between the assets. The embodiments described in FIGS. 4-6 provide additional information which can be used to determine the actual physical spacing between assets in the rack. This in combination with the relative position information, can be used to determine the absolute position of the asset within the rack.

Information about the absolute position could be useful for an off-site manager of a data center. For example, relative position of assets and asset size information might determine that there is 10 U space available in the rack. If you have a 5 U tall asset, you still do not know without relative position if you can bring in the asset and insert it without moving other assets. For example, there might be ten 1 U slots available in the rack which would require moving several assets to fit in the 5 U slot asset into the rack.

To overcome the shortcomings of relative ordering, the distance between each tag (by reference each asset) must be determined to create an absolute ordering of the assets and available rack space. Acoustic ranging, either by itself or in cooperation with another reference signal for timing purposes (e.g. an RF timing signal) can be deployed for this purpose. FIG. 4 shows how such ranging could be applied to the tag array via a combination of optical and acoustic signaling.

FIG. 4 shows a simplified front view of an asset locating system for locating an asset within a data center rack. In contrast to the tags shown in FIGS. 2A and 3A which include an IR signal component and an RF signal component, the tags in the embodiment shown in FIG. 3 also includes an acoustic signal transmitter 310. The acoustic signal in combination with the IR signal provides location information about the asset's orientation and position that is used to determine the physical distance between two tags. Relative position data can be derived using the methods described with respect to FIGS. 2A and 3A. Relative position data in combination with the physical distance between tags can be used to determine the absolute position of the tags within the rack. Because the tags are attached to assets, the absolute position of an asset within the rack can be determined.

In the embodiment shown in FIG. 4, two inter-tag signals (one optical 118a-118n, one acoustic 310a-310n) are issued by the transmitting tag. The relative arrival at the receiving tag is a function of the propagation distance between the two tags. It is well understood that the relative propagation speed of optical and acoustic waves widely differ, and measuring the time delay between the arrivals of the two signals provides the means to calculate the distance between the tags. As the inter server gap is restricted to multiples of 1.75 inches (their U spacing) the overall accuracy of the timing measurement need not be too resolute, as the exact distance can be inferred from a course measurement.

Acoustic ranging could also be performed in isolation, without the use of a reference signal (the IR signal) as described, however, it is more difficult to implement and less accurate. Further, providing the IR optical (or RF) reference link also provides an efficient means to transfer tag identity and ordering information and to also wake-up the (more power consuming) acoustic circuitry prior to use.

Figure 5A:
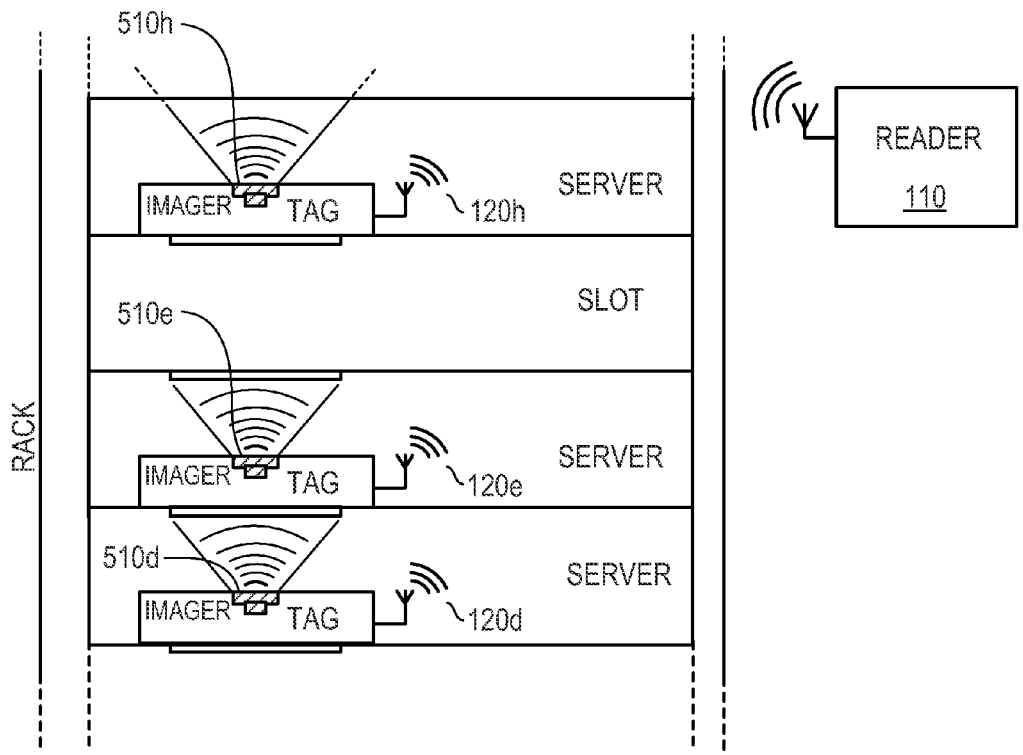
FIG. 5A shows a simplified front view of an asset locating system for locating an asset within a data center rack according to one embodiment of the invention.

FIG. 5A shows a simplified front view of an asset locating system for locating an asset within a data center rack according to another embodiment of the invention. The embodiment shown in FIG. 5A provides another embodiment for finding the physical distance between tags using a low cost imaging device within each tag. Referring to FIG. 5A, one side of the tag (see FIG. 5B) includes a camera 510a-510n or other type of imaging device that is incorporated into each tag. The image information is used to provide location information about the position, orientation information of the asset. The imaging device is used to capture and determine the identity of the adjacent tag.

Figure 5B:
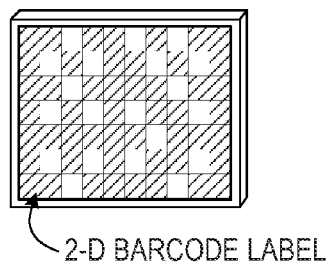
FIG. 5B shows a view of a barcode image incorporated into the asset tag used in the asset locating system shown in FIG. 5A according to one embodiment of the invention.
Figure 5C:
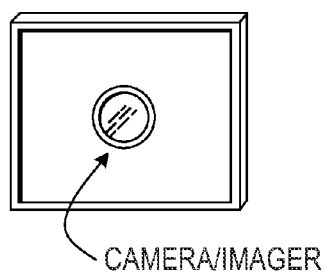
FIG. 5C shows a view of an imaging device incorporated into the asset tag used in the asset locating system shown in FIG. 5A according to one embodiment of the invention.

Referring to FIGS. 5A and 5B, a 2-dimensional barcode is positioned on the underside of each tag. In the tag shown in FIG. 4C, the tag is pre-labeled with a barcode. Alternatively other form of visual identification could be printed on tag. Hence, the embedded image capture device (in line of sight below the barcode) has a clear view of the barcode. Thus, as with the prior examples, tags are able to determine the identity of the adjacent (uppermost) tag in the array and send this data to the data collection unit 110. In addition, the captured image will contain a barcode section which is scaled in proportion to the distance it is positioned away from the imager. Hence by also interpreting the scale of the encoded barcode, the tag can also estimate the physical distance between itself and its nearest neighbor to provide an absolute measurement of the inter-tag gap in the U spaces.

Figure 6A:
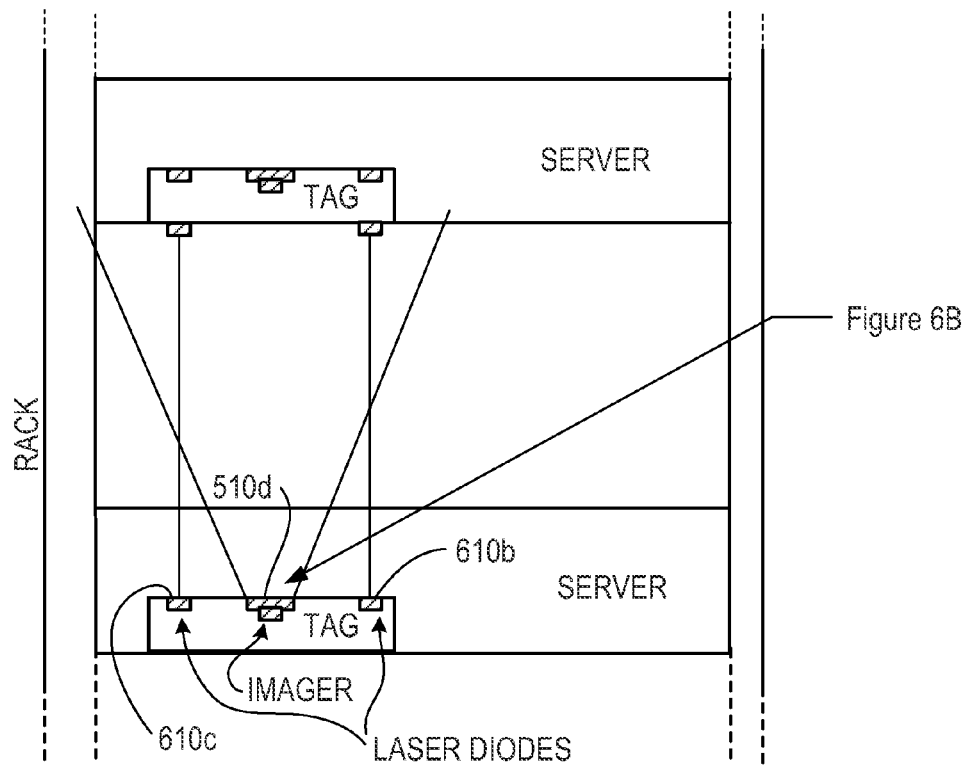
FIG. 6A shows a simplified front view of an asset locating system for locating an asset within a data center rack according to one embodiment of the invention.

FIG. 6A shows a simplified front view of an asset locating system for locating an asset within a data center rack according to alternative embodiment of the invention. The embodiment shown in FIG. 6A is similar to that shown in FIG. 5A in that it includes an imaging device 510 incorporated into the tag. However, in addition to the imaging device, the embodiment shown in FIG. 6A also includes a pair of laser diodes incorporated within each tag. In this case, the identity of the asset is determined by using for example the prior methods e.g. a discrete optical component based data link or an image based barcode read) described with respect to FIGS. 2A, 3A and 5A.

Figure 6B:
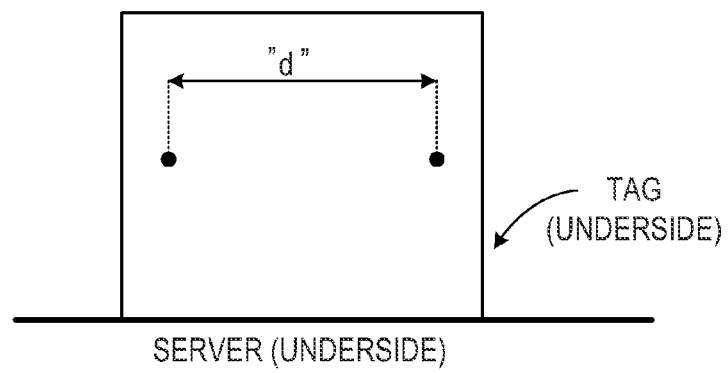
FIG. 6B shows a bottom view of an asset tag used in the asset locating system shown in FIG. 6A according to one embodiment of the invention.

FIG. 6B shows a bottom view of an asset tag used in the asset locating system shown in FIG. 6A according to one embodiment of the invention. FIGS. 6A and 6B shows the underside of the adjacent tag while the laser diode pair is active. As shown in the FIG. 6A, the captured image will contain a pair of dots corresponding to where the laser light beams reach the adjacent tag. Measurement of the distance between these two dots, in the captured image, provides an estimate of the separation gap between the two tags which can be normalized to the adjacent assets separation gap in the U slots.

Figure 7:
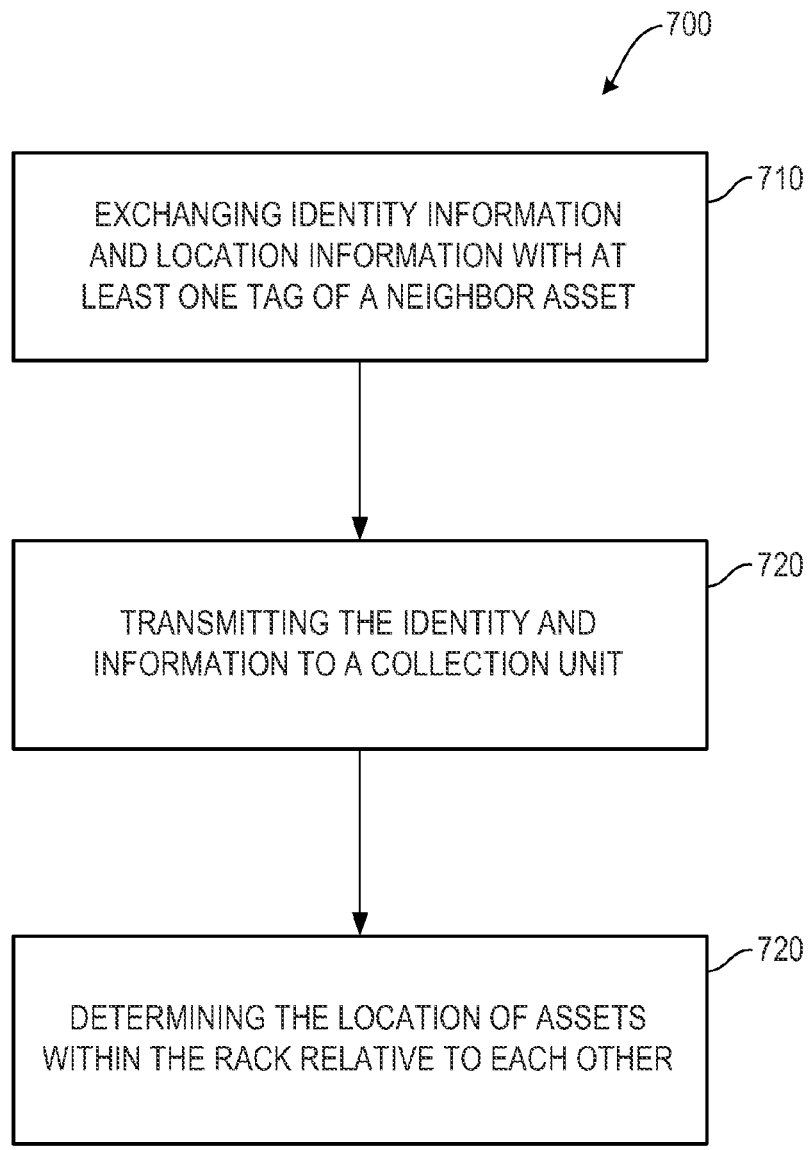
FIG. 7 shows a flowchart of the method of determining an asset location according to one embodiment of the present invention.

FIG. 7 shows a flowchart of the method of determining an asset location according to one embodiment of the present invention. The method 700 may be initiated in response to any of a number of stimuli or conditions. For instance, the method 700 may be manually or automatically initiated. In the latter case, the method 700 may be initiated according to a programmed routine, such as, at various times, for a set duration of time, substantially continuously, etc. In addition, or alternatively, the method 700 may be initiated, for instance, when an asset 104a-104n is detected to be inserted or removed from the rack.

Referring to FIG. 7, the method for determining the asset location includes for each tag, exchanging identity information and location information with at least one tag of a neighbor asset (710), transmitting the identity and location information to a collection unit (720), and determining the location of assets within the rack relative to each other (730).

Some or all of the operations set forth in the method shown in FIG. 7 may be contained as a utility, program or subprogram, in any desired computer accessible medium. In addition, the method 700 may be embodied by a computer program, which may exists in a variety of forms both active and inactive. For example, it may exist as software program(s) comprised of programs instructions in source code, object code, executable code or other formats. Certain processes and operation of various embodiments of the present invention are realized, in one embodiment, as a series of instructions (e.g. software program) that reside within computer readable storage memory of a computer system and are executed by the processor of the computer system. When executed, the instructions cause the computer system to implement the functionality of the various embodiments of the present invention. Any of the above can be embodied on a computer readable medium, which includes storage devices and signals, in compressed or uncompressed form.

The computer readable storage medium can be any kind of memory that instructions can be stored on. Examples of the computer readable storage medium include but are not limited to a disk, a compact disk (CD), a digital versatile device (DVD), read only memory (ROM), flash, and so on. Exemplary computer readable storage signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore understood that any electronic device capable of executing the above-described functions may perform those functions enumerated above.

Figure 8:
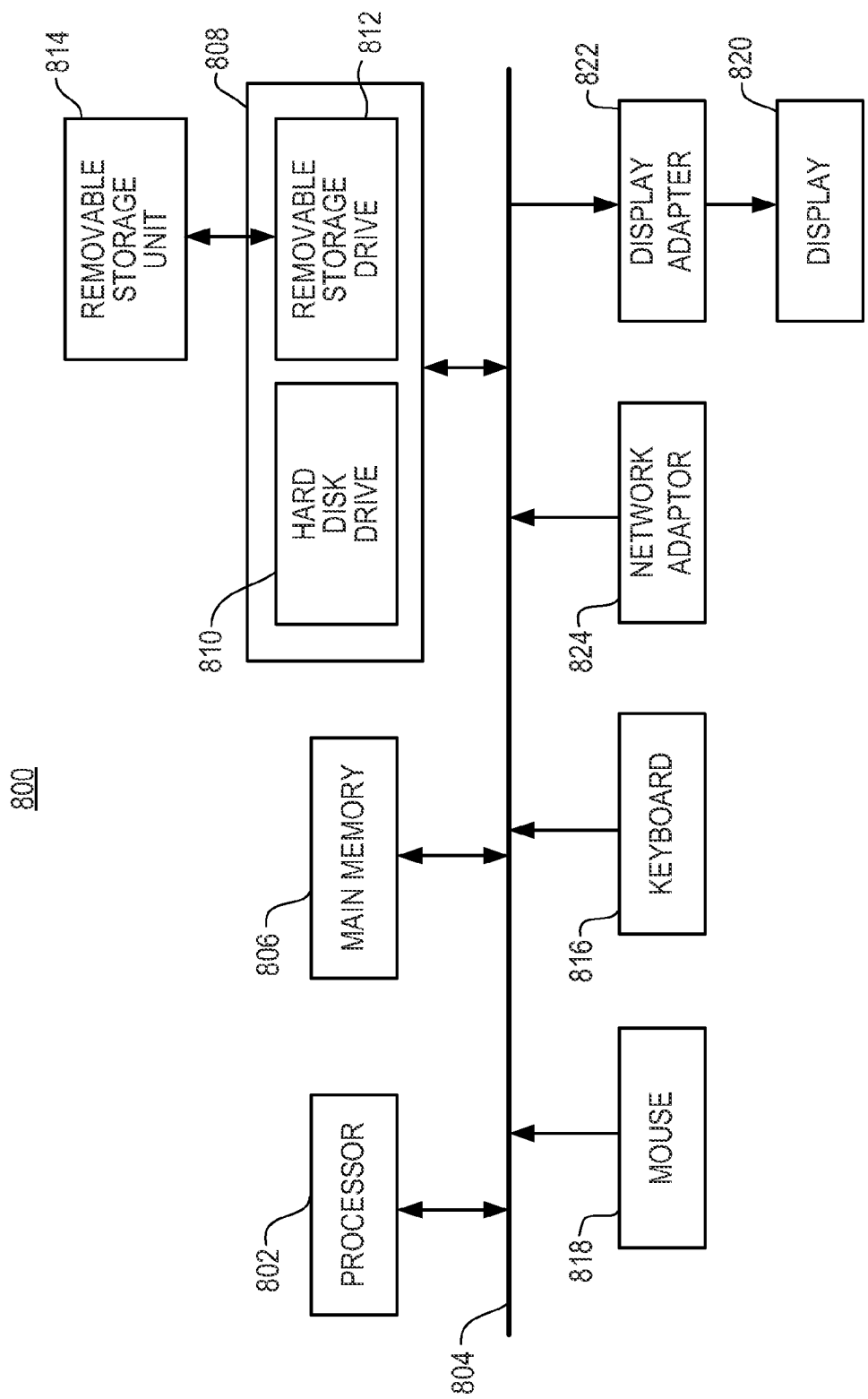
FIG. 8 illustrates a computer system, which may be employed to perform various functions described herein, according to one embodiment of the present invention.

FIG. 8 illustrates a computer system, which may be employed to perform various functions described herein, according to one embodiment of the present invention. FIG. 8 illustrates a computer system 809, which may be employed to perform various functions of the asset location system, described herein above, according to an example. In this respect, the computer system 800 may be used as a platform for executing one or more of the functions described hereinabove with respect to the data collection unit 110.

The computer system 800 includes a microprocessor 802 that may be used to execute some or all of the steps described in the methods shown in FIG. 7. Commands and data from the processor 802 are communicated over a communication bus 804. The computer system 800 also includes a main memory 806, a secondary memory, such as a random access memory (RAM), where the program code, for instance, may be executed during runtime. The secondary memory 808 includes for example, one or more hard disk drives 810 and/or a removable storage drive 812, representing a floppy diskette drive, a magnetic tape drive, a compact disk drive, etc., where a copy of the program code for tracking tags may be stored.

The removable storage drive 820 may read from and/or write to a removable storage unit 814. User input and output devices may include, for instance, a keyboard 816, a mouse 818, and a display 820. A display adapter 822 may interface with the communication bus 804 and the display 820 and may receive display data from the processor 802 and covert the display data into display commands for the display 820. In addition, the processor 802 may communicate over a network, for instance, the Internet, LAN, etc. through a network adapter. The embodiment shown in FIG. 8 is for purposes of illustration. It will be apparent to one of ordinary skill in the art that other know electronic components may be added or substituted in the computer system 800.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A method of determining the location of an asset within a rack comprising the steps of:
  for each asset tag in the rack, exchanging identity information and location information with at least one asset tag of a neighboring asset, wherein at least the location information is exchanged along a substantially physically unobstructed path between the asset tag and its at least one neighboring asset tag and the location information is derived from taking an image of the at least one asset tag of a neighboring asset, the image capturing a dot spacing from a pair of laser diodes in the each asset tag;
  for each asset tag, transmitting the identity information and location information, exchanged to a collection unit; and
  based on the information transmitted to the collection unit, determining the location of the assets relative to other assets in the rack.

2. The method recited in claim 1 wherein the location information and the identity information are transmitted over an RF communication channel and the collection unit is an RFID reader.

3. The method recited in claim 1 wherein the location and identity information are transmitted over a hard wired connection to the rack and the collection unit is a memory device hard electrically connected to the rack.

4. The method recited in claim 1 wherein the location information is information regarding the relative position of the neighboring asset with respect to the asset of interest.

5. The method recited in claim 4, wherein the exchange of information between each asset tag is unidirectional, and the information exchanged cascades in one direction along the asset tag chain until transmission to the collection unit.

6. The method recited in claim 5, wherein there is a single transmitting unit that transmits identification and location information to the collection unit.

7. The method recited in claim 4 wherein each asset tag includes a transmitting unit capable of transmitting identification and location information to the collection unit.

8. The method recited in claim 1 wherein transmitting and receiving pairs for exchanging information transmit location information via an IR communication channel.

9. The method recited in claim 1 wherein at least one of the transmitting and receiving pairs for exchanging location information transmits location information acoustically.

10. The method recited in claim 9, wherein the location information from the acoustic source and the location information from the IR sources are compared to determine the physical distance between the neighboring assets.

11. The method recited in claim 1, wherein the physical distance of the neighboring asset can be determined by the size of the pattern of the image.

12. The method recited in claim 1, wherein the physical distance separating the asset of interest and the neighboring asset can be determined based on the captured image of the dot spacing.

13. A system for determining the location of an asset, comprising:
  a plurality of asset tags, each of the plurality of asset tags associated with an asset, each asset tag capable of exchanging identity information and location information with the asset tag of at least one neighboring asset, wherein at least the location information is exchanged along a substantially physically unobstructed path between the asset tag and its at least one neighboring asset tag and the location information is derived from taking an image of the at least one neighboring asset tag, the image capturing a dot spacing from a pair of laser diodes in each asset tag; and
  a data collection unit, for collecting information transmitted from the plurality of asset tags, wherein based on the identity and location information collected, the data collection unit determines the location of the asset.

14. An asset tag comprising,
  an RF transmitting device for transmitting location and identification information to a collection unit;
  a pair of laser diodes; and
  a local information exchange mechanism for exchanging identity information and location information with at least one neighboring asset, wherein at least the location information is exchanged along a substantially unobstructed path between the local information exchange mechanism and at least one neighboring asset tag and the location information is derived from taking an image of the at least one neighboring asset tag, the image capturing a dot spacing from the pair of laser diodes.

15. The asset tag recited in claim 14 wherein the local information exchange mechanism includes an IR transceiver.

16. The asset tag recited in claim 15 wherein the local information exchange mechanism includes an image capture device for taking an image of the asset tag of the neighboring asset.

17. The asset tag recited in claim 16 wherein the local information exchange mechanism includes an acoustic transceiver.

* * * * *

UNITED STATES PATENT AND TRADEMARK OFFICE
CERTIFICATE OF CORRECTION

| | | |
|---|---|---|
| PATENT NO. | : 8,448,860 B2 | |
| APPLICATION NO. | : 12/714513 | |
| DATED | : May 28, 2013 | |
| INVENTOR(S) | : Geoffrey M Lyon | |

It is certified that error appears in the above-identified patent and that said Letters Patent is hereby corrected as shown below:

In the Specification

In column 5, line 36, before "FIG. 2B" delete "Referring to".

In column 8, line 12, delete "This" and insert -- This, --, therefor.

In column 10, line 3, delete "exists" and insert -- exist --, therefor.

In the Claims

In column 11, line 32, in Claim 1, delete "information," and insert -- information --, therefor.

In column 12, line 4, in Claim 9, delete "claim 1" and insert -- claim 8 --, therefor.

Signed and Sealed this
Fifth Day of November, 2013

Teresa Stanek Rea
*Deputy Director of the United States Patent and Trademark Office*